US010685608B2

(12) United States Patent
Son et al.

(10) Patent No.: US 10,685,608 B2
(45) Date of Patent: *Jun. 16, 2020

(54) DISPLAY DEVICE AND DISPLAYING METHOD

(71) Applicant: SAMSUNG ELECTRONICS CO., LTD., Suwon-si, Gyeonggi-do (KR)

(72) Inventors: Chang-won Son, Seoul (KR); Dae-bong Lee, Yongin-si (KR); Ki-suk Kim, Hwaseong-si (KR); Soo-hong Kim, Seoul (KR); Jong-ho Kim, Suwon-si (KR); Hyun-suk Kim, Seoul (KR); Shin-woo Choi, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/512,519

(22) Filed: Jul. 16, 2019

(65) Prior Publication Data

US 2019/0340983 A1 Nov. 7, 2019

Related U.S. Application Data

(63) Continuation of application No. 15/789,077, filed on Oct. 20, 2017.

(30) Foreign Application Priority Data

Nov. 7, 2016 (KR) .................. 10-2016-0147377

(51) Int. Cl.
*G09G 3/34* (2006.01)
*G06T 15/50* (2011.01)
(Continued)

(52) U.S. Cl.
CPC .......... *G09G 3/3413* (2013.01); *G06T 15/50* (2013.01); *G09G 3/003* (2013.01); *G09G 3/3426* (2013.01);
(Continued)

(58) Field of Classification Search
CPC .. G09G 3/3413; G09G 3/3426; G09G 3/3611; G09G 3/003; G09G 2340/14;
(Continued)

(56) References Cited

U.S. PATENT DOCUMENTS 9,001,010 B2 4/2015 Jeon
2007/0247833 A1 10/2007 Lee et al.
(Continued)

FOREIGN PATENT DOCUMENTS

JP 2008-140107 6/2008
JP 2008-180797 8/2008
(Continued)

OTHER PUBLICATIONS

U.S. Appl. No. 15/789,077, filed Oct. 20, 2017; Son et al.
(Continued)

*Primary Examiner* — Abhishek Sarma
(74) *Attorney, Agent, or Firm* — Nixon & Vanderhye P.C.

(57) ABSTRACT

A display device is disclosed. The display device includes a display including a backlight comprising a plurality of light sources and a display panel and configured to display a background image including a preset object, a sensor disposed at an outer part of the display and configured to sense an external lighting environment and a processor configured to determine a direction of a lighting based on the sensed lighting environment, to display a shadow object for the preset object at a position corresponding to the determined lighting direction, and to adjust a brightness of a light source corresponding to a position of the shadow object from among the plurality of light sources based on the sensed lighting environment.

18 Claims, 11 Drawing Sheets

(51) Int. Cl.
  *G09G 3/00* (2006.01)
  *G09G 3/36* (2006.01)
(52) U.S. Cl.
  CPC ... *G09G 3/3611* (2013.01); *G09G 2320/0626* (2013.01); *G09G 2320/0646* (2013.01); *G09G 2340/14* (2013.01); *G09G 2360/144* (2013.01)
(58) Field of Classification Search
  CPC ..... G09G 2320/0646; G09G 2360/144; G09G 2320/0626; G09G 3/342; G06T 15/50
  See application file for complete search history.

(56) References Cited

U.S. PATENT DOCUMENTS

| | | | |
|---|---|---|---|
| 2010/0079426 A1 | 4/2010 | Pance et al. | |
| 2013/0314433 A1* | 11/2013 | Ko | G09G 3/20 345/592 |
| 2014/0185129 A1* | 7/2014 | Kim | H01L 51/5284 359/296 |
| 2014/0300634 A1 | 10/2014 | Cho et al. | |
| 2015/0339023 A1 | 11/2015 | Park et al. | |
| 2016/0119614 A1 | 4/2016 | Masuda et al. | |
| 2016/0205391 A1 | 7/2016 | Kim | |

FOREIGN PATENT DOCUMENTS

| | | |
|---|---|---|
| JP | 2011-048198 | 3/2011 |
| JP | 10-1639244 | 7/2016 |
| KR | 10-2006-0106046 | 10/2006 |
| KR | 10-2011-0064548 | 6/2011 |
| KR | 10-2014-0054747 | 5/2014 |
| KR | 10-2015-0020912 | 2/2015 |

OTHER PUBLICATIONS

Extended Search Report dated Mar. 20, 2018 in counterpart European Patent Application No. 17195611.3.
Search Report and Written Opinion dated Mar. 21, 2018 in counterpart International Patent Application No. PCT/KR2017/011727.

* cited by examiner

DISPLAY DEVICE AND DISPLAYING METHOD

CROSS-REFERENCE TO RELATED APPLICATION

This application is a Continuation of U.S. application Ser. No. 15/789,077, filed Oct. 20, 2017, which claims priority to KR 10-2016-0147377, filed Nov. 7, 2016, the entire contents of each of which are all hereby incorporated herein by reference.

BACKGROUND

Field

The present disclosure relates generally to a display device and a displaying method, and for example, to a display device capable of displaying a background image which changes adaptively according to a change of a surrounding environment, and a displaying method.

Description of Prior Art

A display device may display an image signal provided from an outside. In recent years, in addition to the function of displaying an image, the functions which provide various user experiences have been added to the display device.

For example, by obtaining a background image of a display device and the display device displaying the background image, a visual effect such that the display appears to be a transparent window may be provided.

However, there is a need for a method of changing the background image adaptively based on a real surrounding environment in that the background environment may, for example, change based on a change of a lighting condition in the real environment.

SUMMARY

An example aspect of the of the present disclosure addresses the problems described above and provides a display device capable of displaying a background image which changes adaptively based on a change of a surrounding environment, and a displaying method.

According to an example embodiment, a display device is provided, including a display including a backlight comprising a plurality of light sources and a display panel configured to display a background image which includes a preset object, a sensor disposed at an outer part of the display and configured to sense an external lighting environment, and a processor configured to determine a direction of a lighting based on the sensed lighting environment, to display a shadow object for the preset object at a position corresponding to the determined lighting direction, and to adjust a brightness of a light source corresponding to a position of the shadow object from among the plurality of light sources based on the sensed lighting environment.

The processor may control the backlight so that brightness of a light source corresponding to the position of the shadow object from among the plurality of light sources is darker than brightness of other light sources.

The processor may calculate (determine) a dimming value for each of the plurality of light sources based on the external lighting environment of the display device and the position of the shadow object, and provide the calculated (determined) dimming value to each of the plurality of light sources.

The processor may determine a size of the shadow object further considering an illumination value and a color temperature.

The processor may calculate (determine) a diming value for each of the plurality of light sources further considering a color temperature.

The plurality of light sources may be arranged in a matrix form.

The sensor may comprise a plurality of illumination sensors arranged at a plurality of positions which are placed apart from each other on the display device.

The plurality of illumination sensors may comprise a first illumination sensor arranged on an upper left side of the display device, and a second illumination sensor arranged on an upper right side of the display device.

The sensor further may comprise a color sensor configured to sense one or more of illumination, light intensity and a color temperature.

According to an example embodiment, a displaying method is provided, including displaying a background image including a preset object using a plurality of light sources, sensing an external lighting environment, and determining a direction of a lighting based on the sensed lighting environment, displaying a shadow object for the preset object at a position corresponding to the determined lighting direction, and adjusting a brightness of a light source corresponding to the position of the shadow object from among the plurality of light sources based on the sensed lighting environment.

The adjusting may control the plurality of light sources so brightness of a light source corresponding to the position of the shadow object from among the plurality of light sources is darker than brightness of other light sources.

The adjusting may calculate (determine) a dimming value for each of the plurality of light sources based on the position of the external lighting environment of the display device and the position of the shadow object, and provide the calculated (determined) dimming value to each of the plurality of light sources.

The adjusting may calculate (determine) a dimming value for each of the plurality of light sources further considering a color temperature.

The adjusting may determine a size of the shadow object further considering an illumination value and a color temperature, and display the shadow object of the determined size at the decided position.

The plurality of light sources may be arranged in a matrix form.

The sensing may sense a lighting environment using a plurality of illumination sensors arranged on a plurality of positions which are placed apart from each other at the outer part of the display device.

The sensing may sense one or more of illumination, light intensity and a color temperature on at least one position among the plurality of positions.

According to an example embodiment, a non-transitory computer-readable recording medium which includes a program to execute the displaying method is provided, and the displaying method may include displaying a background image which includes a preset object using a plurality of light sources, sensing an external lighting environment, and determining a direction of a lighting based on the sensed lighting environment and displaying a shadow object for the preset object at the position corresponding to the determined lighting direction, and adjusting brightness of a light source corresponding to the position of the shadow object from among the plurality of light sources based on the sensed lighting environment.

BRIEF DESCRIPTION OF THE DRAWINGS

The above and other aspects, features and attendant advantages of the present disclosure will become apparent and more readily understood from the following detailed description, taken in conjunction with the accompanying drawings, in which like reference numerals refer to like elements, and wherein.

DETAILED DESCRIPTION

Figure 1:
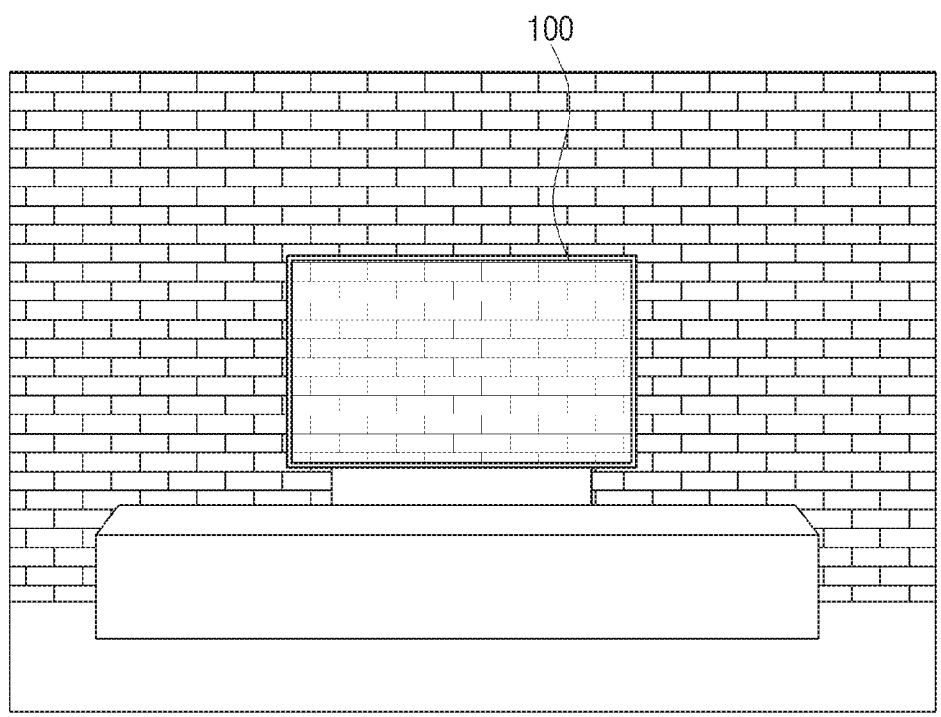
FIG. 1 is a diagram an example of providing an image effect such that the display appears as a transparent window according to an example embodiment.

The various example embodiments may have a variety of modifications and several embodiments. Accordingly, various example embodiments will be illustrated in the drawings and described in detail in the detailed description. However, this does not necessarily limit the scope of the example embodiments to a specific embodiment form. Instead, modifications, equivalents and replacements included in the disclosed concept and technical scope of this disclosure may be employed. In describing the example embodiments, well-known functions or constructions may not be described in detail where they may obscure the disclosure with unnecessary detail.

The terms such as "first," "second," and so on may be used to describe a variety of elements, but the elements should not be limited by these terms. The terms are used simply to distinguish one element from other elements.

The terms used herein are solely intended to explain a specific example embodiment, and not to limit the scope of the present disclosure. Singular forms are intended to include plural forms unless the context clearly indicates otherwise. The singular expression also includes the plural forms unless the context clearly indicates otherwise. The terms, "include", "comprise", "is configured to", etc. of the description are used to indicate that there are features, numbers, steps, operations, elements, parts or combination thereof, and they should not exclude the possibilities of combination or addition of one or more features, numbers, steps, operations, elements, parts or combination thereof.

In an example embodiment, 'a module' or 'a unit' performs at least one function or operation, and may be realized as hardware, such as a processor or integrated circuit, software that is executed by a processor, or a combination thereof. In addition, a plurality of 'modules' or a plurality of 'units' may be integrated into at least one module and may be realized as at least one processor except for 'modules' or 'units' that should be realized in a specific hardware.

Below, various example embodiments will be described in greater detail with reference to the attached drawings.

FIG. 1 is a diagram illustrating an example operation of a display device according to an example embodiment.

The display device 100 according to an example embodiment may have two operation modes. A first operation mode may be a mode which displays a general image. For example, in the first operation mode, the contents may be pre-stored in the display device 100 or be a broadcast received from an outside, and may be displayed using an entire screen of the display device.

In the second display mode, the display device may display a background image so that, for example, a user does not easily recognize the display device. Here, the background image is the image of a background where the display is located, which may be captured by a user in advance.

As in the above, if the second operation mode is displayed, the display device 100 displays the background image as the background of the display device, and thus the display device may appear to be a transparent window.

In the second operation mode, a specific object may be displayed in addition to the background image. For example, and without limitation, the specific object may be a clock object, but various objects (e.g., a drawing, a picture, a fishbowl, or the like) which can be attached to the general wall may be displayed.

Meanwhile, if the display device 100 operates in the second operation mode, that is, if the background image is displayed, a difference between the brightness of the real background environment and the brightness of the background image displayed on the display device 100 should be low so that it is difficult for a user to sense of difference between the display device 100 and the real background image.

Accordingly, the background image displayed on the display device 100 according to an example embodiment, may be configured to change adaptively based on the change of the surrounding environment of the display device 100.

Accordingly, the display device 100 according to the example embodiment may sense the surrounding lighting environment and adjust the brightness of the image displayed on the display device adaptively based on the sensed surrounding lighting environment. For example, the display device 100 according to the example embodiment may sense the direction of the surrounding lighting and display the background image which is adapted to the sensed lighting direction.

Hereinafter, the above operation will be described in greater detail below with reference to various example configurations of the display device.

Figure 2:
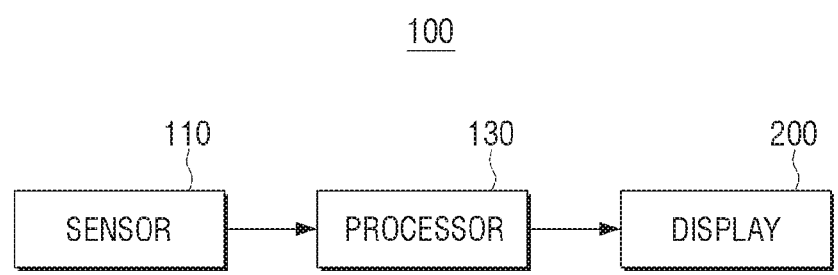
FIG. 2 is a block diagram illustrating an example configuration of a display device according to an example embodiment.

FIG. 2 is a block diagram illustrating an example configuration of the display device according to an example embodiment.

Referring to FIG. 2, the display device comprises a sensor 110, a processor (e.g., including processing circuitry) 130 and a display 200.

The sensor 110 may include various sensors, and may sense a lighting environment of the surrounding of the display device. For example, the sensor 110 may include a plurality of sensors arranged on the positions which are placed apart from each other on the display device. The sensor 110 may be comprise two or more sensors. Here, the sensor may be an illumination sensor which senses an illumination, and may be a color sensor which senses a color temperature in addition to the illumination. Meanwhile, the sensor may be built in the frame of the display device not to be affected by a lighting emitted from the display 200.

Accordingly, if the sensor 110 includes two sensors, the sensor 110 may include one illumination sensor and one color sensor or may include two color sensors. Meanwhile, during implementation, the two sensors may be implemented as an illumination sensor, but it is desirable that at least one color sensor is included.

Figure 5:
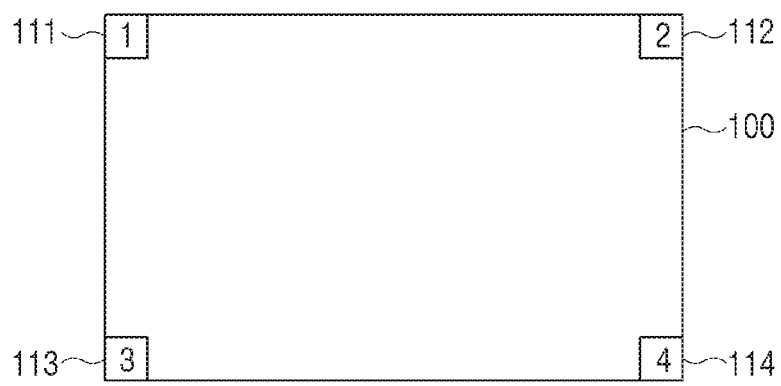
FIG. 5 is a diagram illustrating an example arrangement of a plurality of sensors according to an example embodiment.

If the sensor 110 includes four sensors, the arrangement form of the sensor 110 may be as illustrated FIG. 5. This arrangement form will be described in greater detail below with reference to FIG. 5.

The sensor 110 may further include, for example, and without limitation, an infrared (IR) sensor, an ultrasonic sensor, and a radio frequency (RF) sensor, or the like, and may detect a position of a user.

The display 200 displays an image. The display may be implemented as various forms of displays such as a Liquid Crystal Display (LCD), a Plasma Display Panel (PDP) or the like, but is not limited thereto. In the display 200, a driving circuit that may be implemented in the form of an amorphous silicon (a-si) thin-film transistor (TFT), a low temperature poly silicon (LTSP) TFT, or an organic TFT (OTFT), and a backlight unit, or the like, but is not limited thereto. Meanwhile, the display 200 may be implemented as a touch screen as it is combined with a touch detector.

The display 200 includes a backlight. Here, the backlight is a point source of light including a plurality of light sources, and is configured to support local dimming.

Here, the light source which forms the backlight may include a Cold Cathode Fluorescent Lamp (CCFL) or a Light Emitting Diode (LED), or the like, but is not limited thereto. Hereinafter, for ease of explanation, and without limitation, it will be illustrated that the backlight comprises an LED and an LED driving circuit, but during implementation, the backlight can be comprises of other configurations in addition to the LED. In addition, the plurality of light sources comprising the backlight may be arranged in various forms and various local dimming technology may be applied thereto. For example, the backlight may be the direct type backlight in which the plurality of light sources arranged in a matrix form are substantially uniformly arranged behind the entire liquid crystal screen. In this case, the backlight may operate as a full-array local dimming or a direct local dimming. Here, the full-array local dimming is the method in which light sources are arranged evenly on the overall rear side of an LCD screen, and a brightness of each light source is adjusted. The direct local dimming is similar to the full-array local dimming method, but a brightness of each light source, the number of which is less than the number of light sources of the full-array local dimming method, is adjusted.

In addition, the backlight may be the edge type backlight in which a plurality of light sources are arranged at the edge of an LCD. In this case, the backlight may operate as an edge-lit local dimming. Here, in the edge-lit local dimming, a plurality of light sources may be arranged only at the edge of a panel, only at the left/right of a panel, only at the up/down of a panel, or at the left/right/up/down of a panel.

The processor 130 may include various processing circuitry and operates an overall operation of the display device 100. For example, the processor 130 may determine an operation mode of the display device 100. For example, if a TV display command or a contents display command is input from a user, the processor 130 may determine that it is the first operation mode which displays a general image. In the first operation mode, if a power command or a conversion command of an operation mode is input, the processor 130 may determine that is the display is to be operated in the second operation mode which displays a background image. Accordingly, based on the general power operation according to an example embodiment, the first operation mode and the second operation mode may be switched.

While the display device 100 operates in the first operation mode or the second operation mode, if a user pushes a power button for a preset time, the processor 130 may switch the mode to the general power off mode.

If the power command is input in the power off mode, the processor 130 may determine to operate as the operation mode right before the power off.

If the operation mode of the display device 100 is determined to be the first operation mode, the processor 130 may control the display 200 to display an image based on the control command received from an operator 175.

Here, the processor 130 may generate a plurality of dimming signals corresponding to the brightness value of the displayed image, and provide the signals to the display 200. Here, the processor 130 may adjust the brightness of the displayed image considering an external brightness value using one brightness value among the brightness value sensed at a plurality of sensors in the sensor 110.

If it is determined that the operation mode of the display device 100 is the second operation mode, the processor 130 may control the display 200 to display a background image. Here, the background image may be a photo image corresponding to the rear side of the display device 100 or an image generated through the surrounding image of the display device 100. The background image may further include a graphic image.

The processor 130 may control the sensor 110 to sense a lighting environment for the periphery of the display device 100 and determine the direction of a lighting based on the sensed lighting environment. For example, the processor 130 may confirm illumination values for a plurality of areas of the display 200 based on the signal values sensed at each of a plurality of sensors. Here, the plurality of areas may include, for example, two or three areas, and may correspond to the number of LED modules which make up the backlight.

For example, if the display 200 operates using five light sources, the processor 130 may calculate (determine) the illumination value for each of five areas which may be divided into five in a horizontal orientation. Here, each of the light sources may operate as one dimming signal. For example, each of the light sources may be include one LED and may include one string in which a plurality of LEDs are connected in series. Meanwhile, it has been described that the light sources are arranged in a horizontal orientation, but in the configuration of a direct type backlight, the plurality of light sources may be arranged in a matrix form and the processor 130 may calculate (determine) an illumination value for each position of the plurality of light sources.

The processor 130 may estimate a position of a lighting based on the calculated (determined) illumination value. If sensors are arranged only at the left and the right directions, that is, a plurality of sensors are arranged in one horizontal orientation, it may be determined that if the lighting is positioned at the left, at the upper side, or at the right. Meanwhile, during implementation, the processor 130 may determine the position of the lighting as an angle formation based on the intermediate position of the display 200.

If the sensors are arranged at the four positions illustrated in FIG. 5, the processor 130 may determine the high and low of a lighting. If the high and low of the lighting is determined as in this case, the processor 130 may control the plurality of light sources to have different brightness values also based on a vertical orientation.

In addition, the processor 130 may perform a local dimming for each of a plurality of light sources based on the sensed lighting environment. For example, the processor 130 may perform a local dimming for the light source corresponding to the area which has a bright lighting to have a high brightness, and perform the local dimming for the light source corresponding to the area which has a dark lighting to have a low brightness.

Accordingly, the processor 130 may provide the dimming signal corresponding to the plurality of calculated dimming values to each of the plurality of light sources. Here, the dimming signal may be a PWM signal which has a duty corresponding to the calculated dimming value. Meanwhile, it has been described above that the processor 130 provides the dimming signal of a pulse width modulation (PWM) signal form, but during implementation, the processor 130 may transmit the dimming value in a digital method and control the light source by generating the dimming single corresponding to the dimming value transmitted from the display 200.

The processor 130 may perform an image process for a background image to be displayed. For example, the processor 130 may perform an image process which converts a color temperature of the background image based on the color temperature sensed in the sensor 110. Here, the processor 130 may perform an image process for the background image which will be displayed, based on the illumination value for each of the plurality of areas calculated in the preceding process.

When displaying the background image, the processor 130 may control the display 200 to display an object together with the background image. For example, the processor 130 may generate the screen including a preset object and a background image, and provide the generated screen to the display 200. Here, the preset object may be an analog clock, a digital clock, or the like, but is not limited thereto, and various graphic objects such as a photo, a picture, a fish bowl, or the like, but is not limited thereto. The graphic object may be a static graphic object such as a photo and a picture, and may be an operation object.

The processor may determine the direction of a lighting based on the sensed lighting environment, and control the display to display the shadow object for an object at the position corresponding to the determined lighting direction. In addition, the processor 130 may determine the size of the shadow object based on the sensed lighting value and a color temperature, and control the display to display the shadow object having the determined size. For example, the shadow may be changed based on a lighting intensity or a color temperature of a lighting. Accordingly, the display device 100 according to an example embodiment may generate and display the shadow object considering the lighting intensity or the color temperature.

The processor 130 may control the backlight so the brightness of the light source corresponding to the position of the shadow object from among a plurality of light sources is darker than the brightness of the other light sources. For example, the processor 130 may calculate a dimming value for each of the plurality of light sources based on the peripheral illumination value and a position of the shadow object, and provide the calculated dimming values to each of the plurality of light sources.

Meanwhile, during implementation, the display 200 may display a plurality of objects, and in this case, the processor 130 may provide the screen having a plurality of objects and the shadow object for each of the plurality of objects to the display 200.

The processor 130 may determine the lighting direction based on the sensed lighting environment, and control the display 200 to display the shadow object of the frame of the display device 100 on the position corresponding to the determined lighting direction. In addition, the processor 130 may perform a local dimming so that the area in which the shadow object of the frame is arranged is darker than the peripheral area and that the lighting source corresponding to the area in which the shadow object for the frame is arranged has low brightness.

In the second operation mode, the processor 130 may, for example, and without limitation, display a background image if a user is sensed in the peripheral area of the display device 100 by, for example, an infrared sensor, or the like, in order to reduce power usage. That is, if a user is not sensed in the peripheral area of the display device 100 in the second operation mode, the processor 130 may not display the background image.

The processor 130 may control the display 200 so that in the second operation mode, the display 200 operates with a frame rate lower than the frame rate in the first operation mode. For example, if the display 200 displays an image in 240 Hz in the first operation mode, the processor 130 may control the display 200 to operate in 120 Hz or in 60 Hz which is slower than 240 Hz, in the second operation mode.

Based on the position of a user sensed through the sensor 110, the processor 130 may change the dimming value for a backlight and provide the changed dimming value. For example, the processor 130 may change the dimming value based on the position of a user so that a viewing angle is improved, and provide the changed dimming value to the backlight.

If a user is not sensed through the sensor 110, the processor 130 may control the display 200 so that a displaying operation of an image is not performed.

Based on the weather information received from the communicator 170 to be described later (see, e.g., FIG. 3), the processor 130 may cause the corresponding object to be displayed, or perform a specific event. For example, if rain information is sensed in the weather information, the processor 130 may control the display 200 to display a rain object on the background image, and control an audio output unit 155 to output the sound of rain.

As described above, the display device 100 according to an example embodiment may change the brightness of the background image adaptively based on the sensed lighting environment, the transparent effect of the display 100 may be maximized and/or improved. The display device 100 according to an example embodiment changes a brightness based on the lighting environment through a partial dimming control, and thus the transparent effect may be maximized and/or improved using reduced resources.

Figure 3:
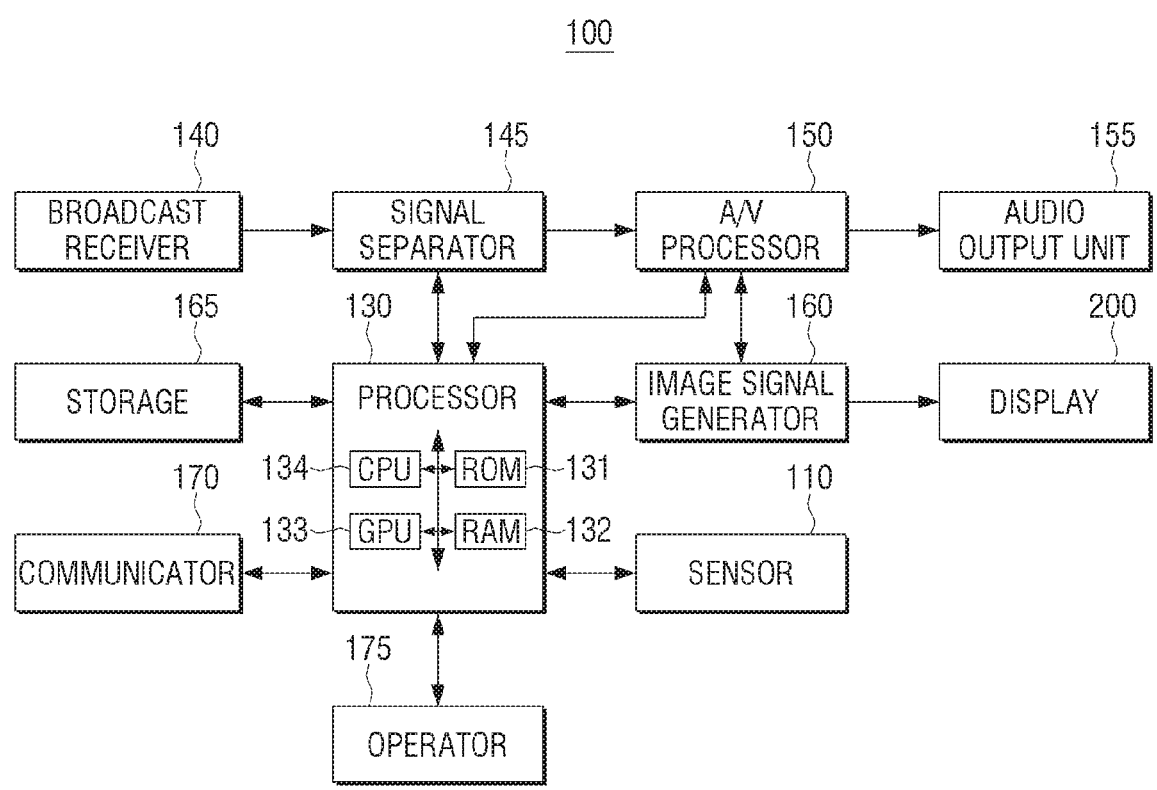
FIG. 3 is a block diagram illustrating an example configuration of a display device according to an example embodiment.

In the above, a brief configuration of the display device 100 has been described, but the display device 100 may further include, for example, and without limitation the example configuration illustrated in FIG. 3. The configuration \ of the display device 100 will be described in greater detail below with reference to FIG. 3.

FIG. 3 is a block diagram illustrating an example configuration of the display device according to an example embodiment.

Referring to FIG. 3, the display device 100 according to an example embodiment may include the sensor 110, the display 200, the processor (e.g., including processing circuitry) 130, a broadcast receiver 140, a signal separator (e.g., including signal separation circuitry) 145, an audio/video (A/V) processor (e.g., including A/V processing circuitry) 150, an audio output unit (e.g., including audio output circuitry) 155, an image signal generator (e.g., including image signal generating circuitry) 160, a storage 165, a communicator (e.g., including communication circuitry) 170 and the operator (e.g., including input circuitry) 175.

The configurations of the sensor 110 and the display 200 are the same as or substantially similar to the configuration illustrated in FIG. 2, and thus a repeated explanation will not be provided here.

The broadcast receiver 140 may include various circuitry and receive a broadcasting signal in a wired or wireless manner from a broadcasting station or a satellite and demodulate the received broadcasting signal. For example, the broadcast receiver 140 may receive a transmission stream through an antenna or a cable and demodulate the transmission stream to output a digital transmission stream signal.

The signal separator 145 may include various circuitry that separates a transmission stream signal provided from the broadcast receiver 140 into an image signal, an audio signal and an additional information signal. Further, the signal separator 145 may transmit the image signal and the audio signal to the A/V processor 150.

The A/V processor 150 may include various A/V processing circuitry and perform a signal processing such as a video decoding, a video scaling, and an audio decoding, with respect to the image signal and the audio signal that are input from the broadcast receiver 140 and/or the storage 165. Also, the A/V processor 150 may output the image signal to the image signal provider 160 and output the audio signal to the audio output unit 155.

In the case of storing the received image and the audio signal in the storage 165, the A/V processor 150 may output the image and the audio to the storage 165 in, for example, a compressed form.

The audio output unit 155 may include various audio output circuitry and convert the audio signal that is output from the A/V processor 150 into sound, and may output the sound through a speaker (not shown) or to an external device connected thereto through an external output terminal (not shown).

The image signal provider 160 may include various circuitry and generate a Graphic User Interface (GUI) to be provided to a user. Further, the image signal provider 160 may add the generated GUI to an image that is output from the A/V processor 150. In addition, the image signal provider 160 may provide the image signal corresponding to the image in which the GUI is added to the display 200. Accordingly, the display 200 displays various kinds of information provided from the display device 100 and the image transmitted from the image signal provider 160.

In addition, the image signal provider 160 may combine and output the image output from the A/V processor 150 and the image generated in a Graphic Processing Unit (GPU) 133. For example, the image signal provider 160 may receive a background image as one layer, receive the image generated in the A/V processor 150 as another layer, and output one of two layers or synthesize (or merge) the two layers to provide to the display 200.

The image signal provider 160 may obtain brightness information corresponding to an image signal and generate one dimming signal corresponding to the obtained brightness information. The image signal provider 160 may generate one dimming signal considering the lighting environment sensed in the sensor 110. The image signal provider 160 may provide the generated dimming signal to the display 200. This dimming signal may be a PWM signal.

The image signal provider 160 may generate a plurality of dimming signals when the display device 100 operates as the second operation mode. For example, the operation of the processor 130 that generates a dimming signal described above may be performed in the image signal provider 160.

The storage 165 may store image contents. For example, the storage 165 may receive and store the image contents, in which an image and an audio are compressed, from the A/V processor 150, and output the image contents stored under the control of the processor 130 to the A/V processor 150. The storage 165 may be implemented as a hard disk, a nonvolatile memory, a volatile memory, or the like.

The operator 175 may include various input circuitry and may be implemented as a touch screen, a touch pad, a key button, a key pad, or the like, but is not limited thereto, and provides a user operation of the display device 100. It has been explained that a control command is received through the operator 175 included in the display device 100 as an example, but the operator 175 may receive a user operation from an external control device (e.g., a remote controller).

The communicator 170 may include various communication circuitry and communicates with various types of external devices according to various types of communication schemes. The communicator 170 may include various communication circuitry, such as, for example, and without limitation, a Wi-fi chip 331 and/or a Bluetooth chip 332. The processor 130 may communicate with various types of external devices using the communicator 170. For example, the communicator 170 may receive a control command from the control terminal apparatus (e.g., a remote controller) which can control the display device 100.

The communicator 170 may acquire weather information through the communication with an external server.

Although not illustrated in FIG. 3, according to example embodiments, the communicator 170 may further include a USB port to which a USB connector can be connected, various external input ports for connecting various external terminals such as a headset, a mouse, and LAN, and a Digital Multimedia Broadcasting (DMB) chip that receives and processes a DMB signal.

The processor 130 may include various processing circuitry and controls an overall operation of the display device 100. For example, in the first operation mode, the processor 130 may control the image signal provider 160 and the display 200 so that an image according to the control command received through the operator 175 is displayed.

The processor 130 may include, for example, and without limitation, a read only memory (ROM) 131, a random access memory (RAM) 132, a GPU 133, a central processing unit (CPU) 134 and a bus. The ROM 131, RAM 132, GPU 133 and the CPU 134 may be connected to each other through a bus.

The CPU 134 accesses the storage 175 and performs booting by using an operating system (O/S) stored in the storage 165. In addition, the CPU 134 may perform various operations using a variety of programs, contents, data, and the like stored in the storage 165. This operation is the same as or similar to the operation of the processor 130 illustrated in FIG. 2, and thus a repeated explanation will not be provided.

The ROM 131 stores a command set for system booting. If a turn-on command is input and thus power is applied, the CPU 134 may copy the O/S stored in the storage 165 to the RAM 132 according to the command stored in the ROM 131 and may execute the O/S to boot the system. When booting is completed, the CPU 134 copies various programs stored in the storage 165 to the RAM 132 and executes the programs copied to the RAM 132 to perform various operations.

When the booting of the display device 100 is completed, the GPU 133 may generate a screen which includes various objects such as an icon, an image, a text, etc. For example, if the display device 100 operates as the second operation mode, the GPU 133 may generate a screen which includes a preset object in a background image. In addition, the GPU 133 may generate a screen which includes the shadow object corresponding to the displayed object and/or the shadow object corresponding to the frame of the display device 100.

The above GPU configuration may include an additional configuration such as an image signal generator 160, and realized as a configuration such as a system on chip (SoC) combined with a CPU in the processor 130.

As described in the above, the display device 100 according to an example embodiment changes the brightness of a background image adaptively based on the sensed lighting environment, and thus the transparent effect of the display device 100 may be maximized and/or improved.

Figure 4:
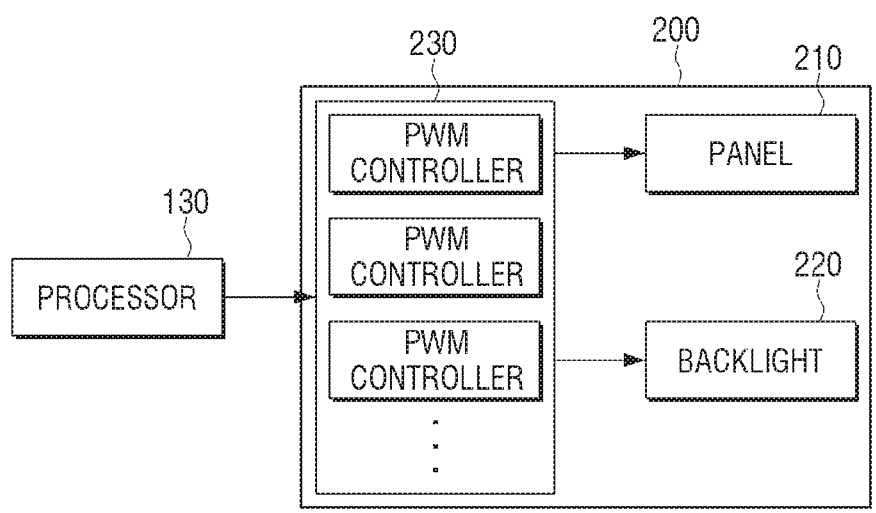
FIG. 4 is a block diagram illustrating an example configuration of a display device of FIG. 2.

FIG. 4 is a diagram illustrating an example configuration of the display of FIG. 2.

Referring to FIG. 4, the display 200 comprises an image board 230, a panel 210, and a backlight 220.

In the image board 230, various circuits or chips for an image processing and an overall control of the display may be arranged. For example, the image board 210 may process an input image signal and generate a red, green, and blue (RGB) image signal and an input control signal. Here, the input control signal may include, for example, and without limitation, a data enable signal (DE), a horizontal sync signal (Hsync), a vertical sync signal (Vsync), and a main clock signal (MCLK).

The image board 230 may generate a dimming signal corresponding to each of a plurality of light sources. For example, the image board 230 may receive a dimming value for each of the plurality of light sources from the processor 130, generate a dimming signal corresponding to the received dimming value and provide the generated dimming signal to the backlight 220, e.g., via a PWM controller. Meanwhile, it has been explained that the image board 230 receives a dimming value from the processor 130 and generates a dimming signal corresponding thereto, but it is also possible that the dimming value is generated based on the image signal directly input from the image board 230 and the dimming signal is generated by the generated dimming value.

The panel 210 may have liquid crystal transmittance that is changed based on the applied voltage. For example, the panel 210 may, for example, include a liquid crystal layer interposed between two glass substrates, and may include m×n liquid crystal cells (Clc) that are arranged in the form of a matrix in which m data lines and n data lines crossed each other.

The backlight 220 may emit light to the panel 210 arranged at the rear side of the panel 210. The backlight 220 is the point source of light which supports a local dimming, and may be a direct type backlight in which a plurality of light sources are arranged in a matrix form or an edge type backlight in which a plurality of light sources are arranged in a horizontal orientation of the display at preset intervals. In addition, each of the light sources may include one LED or an LED string in which a plurality of LEDs are connected in series.

Meanwhile, if an LED is used to emit light, the backlight may include an LED driver for driving an LED. For example, the LED driver may provide a constant current corresponding to a lighting value to an LED so the backlight operates with a brightness value corresponding to the dimming information provided from the image board 230.

Figure 6:
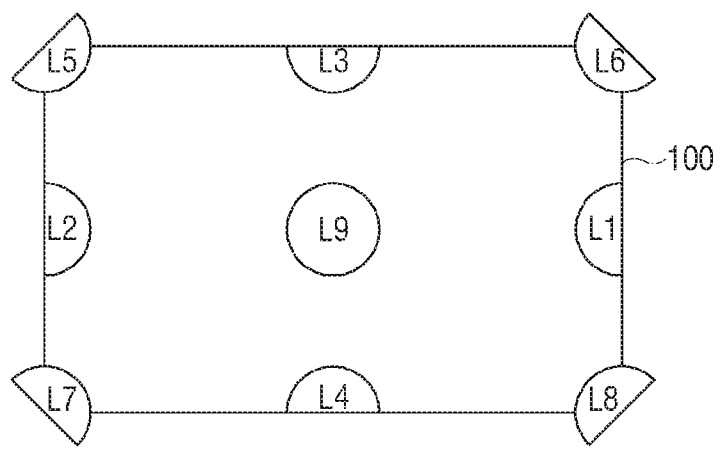
FIG. 6 is a diagram illustrating an example method for acquiring an illumination value for a plurality of areas using a value obtained from the sensor(s) of FIG. 5.

FIG. 5 is a diagram illustrating an example arrangement of a plurality of sensors according to an example embodiment. FIG. 6 is a diagram illustrating an example method for acquiring an illumination value for a plurality of areas using the value obtained from the sensor(s) of FIG. 5.

Referring to FIGS. 5 and 6, the sensor 110 includes four sensors 111, 112, 113 and 114.

The first sensor 111 may be arranged at an upper left side of the display device and implemented as an illumination sensor or a color sensor.

The second sensor 112 may be arranged at an upper right side of the display device and implemented as an illumination sensor or a color sensor.

The third sensor 113 may be arranged at a lower left side of the display device and implemented as an illumination sensor or a color sensor.

The fourth sensor 114 may be arranged at a lower right side of the display device and implemented as an illumination sensor or a color sensor.

As illustrated above, the sensor 110 includes four sensors, and the illumination difference between the left and the right sides of the display device 100 may be confirmed by comparing the illumination values of the first sensor 111 and the second sensor 112, or comparing the illumination values of the third sensor 113 and the fourth sensor 114.

In addition, by comparing the illumination values of the first sensor 111 and the third sensor 113, or comparing the second sensor 112 and the fourth sensor 114, the illumination difference between the up and down sides of the display device 100 may be confirmed.

At least one of the above illustrated sensors may be a color sensor. The color sensor may measure a light intensity in addition to the illumination value. Accordingly, the processor 130 may change the length of the shadow for an object according to the intensity of the color sensor. That is, if it is sensed that a light intensity is strong, the processor 130 may clearly display the light and shade of the shadow on the object.

The processor 130 may calculate an illumination value for each of nine areas (e.g., L1, L2, L3, L4, L5, L6, L7, L8 and L9) using the illumination values sensed by the four sensors, as illustrated in FIG. 6. During implementation, the illumination value for a desired area (e.g., a left area, a middle area, and a right area), not for each of the nine areas, may be calculated.

The processor 130 may identify the position of a lighting based on the illumination values sensed by the four sensors.

For example, if the illumination value of the first sensor 111 may be the highest and the illumination values of the other sensors 112, 113 and 114 are similar to each other, the processor 130 may determine that a light source is positioned at L5 direction in FIG. 6.

If the illumination values of the first sensor 111 and the third sensor 113 are similar to each other and the illumination values of the second sensor 112 and the fourth sensor 114 are low, the processor 130 may determine that the light source is positioned at L2 direction in FIG. 6.

In addition, if the illumination values of the four sensors are similar to each other, the processor 130 may determine that the light source is positioned at the upper side of L9.

Figure 7:
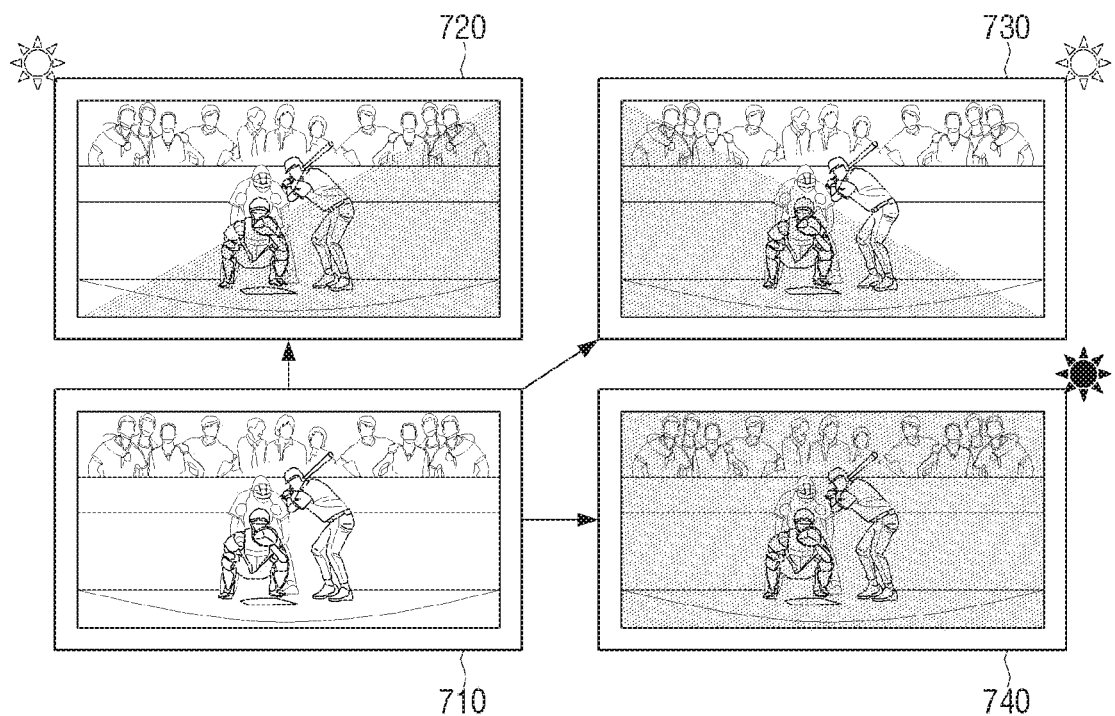
FIG. 7 is a diagram illustrating an example that changes a background image based on the acquired illumination value according to a first example embodiment.

FIG. 7 is a diagram illustrating an example that changes the background image based on the acquired illumination value according to an example embodiment.

Referring to FIG. 7, the direction of a shadow is changed to maximize and/or improve a transparent effect of the display device 100.

For example, a first image 710 is a view to which the shadow effect is not applied.

In a second image 720, if a light source is arranged at the left upper side, the shadow effect is applied to the lower right side.

In a third image 730, if the light source is arranged at the right upper side, the shadow effect is applied to the lower left side.

In a fourth image 740, a light source is not sensed, and thus a shading is applied to an entire image.

During implementation, the above explained length of the shadow effect may be changed based on the light intensity (or a color temperature) sensed in the color sensor.

It has been described that the up/down arrangement of the light source is considered in addition to the left/right arrangement of the light source. However, considering the environment in which the real display device 100 is arranged, the lighting in a typical house is normally positioned only at the upper side of the display device 100. That is, the direction of the light source is generally changed within the left/right direction only, and thus only two sensors may be used. This operation will be described in greater detail below with reference to FIG. 8.

Figures 8A, 8B:
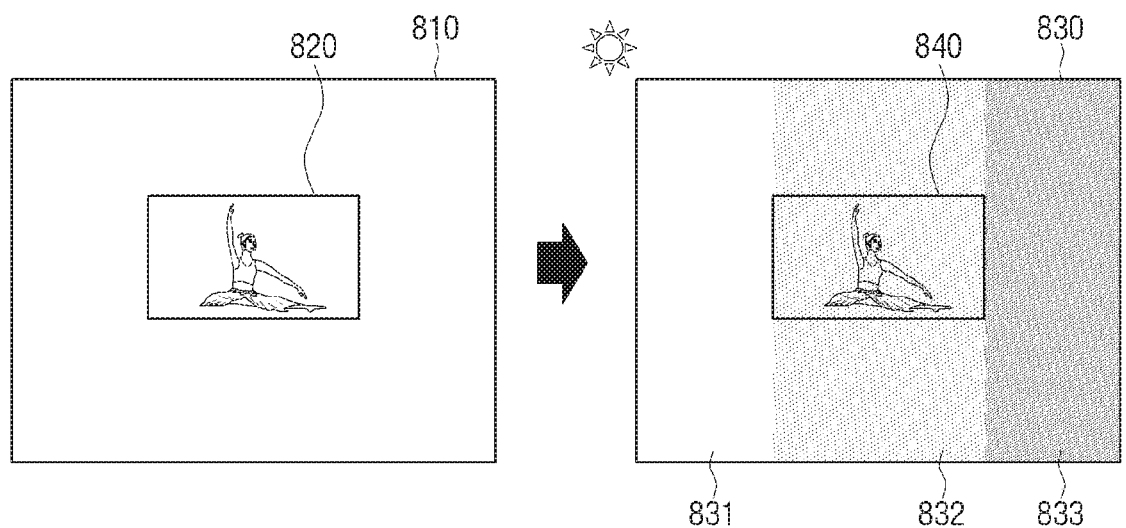
FIGS. 8A and 8B are diagrams illustrating an example that changes a background image based on the acquired illumination value according to a second example embodiment.

FIGS. 8A and 8B are diagrams illustrating an example that changes a background image based on the acquired illumination value according to a second example embodiment. In addition, FIG. 10 is a diagram illustrating an example method for acquiring an illumination value for a plurality of areas using two sensors.

Figure 10:
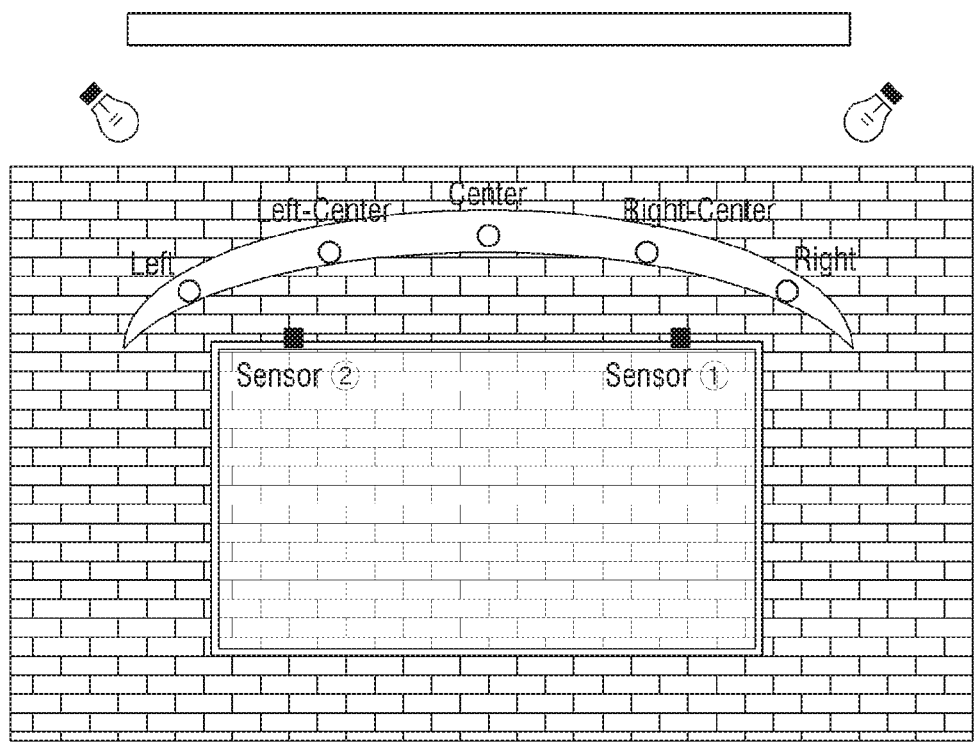
FIG. 10 is a diagram illustrating an example method of acquiring illumination values for a plurality of areas using two sensors according to an example embodiment.

Referring to FIGS. 8A, 8B and 10, the sensor 110 includes two sensors which are placed apart from each other in a horizontal orientation.

The processor 130 determines a position of a light source based on the illumination value sensed in the two sensors. In the case of FIG. 8B, it is considered that the illumination value of the left sensor may be detected stronger, and thus the processor 130 may determine that the light source is arranged at the left side of the display device 100.

Accordingly, the processor 130 may control the display 200 so that the area corresponding to the right side of the image has lower brightness value than the left side. For example, if a lighting is at the left side, the wallpaper near the light source would be brighter than the wallpaper far from the light source. In order to reflect this real environment, the processor 130 may control the dimming value of a backlight partially.

Meanwhile, when a background image is displayed, a specific object may be displayed together with the image corresponding to the background image. For example, as illustrated in FIGS. 8A and 8B, the display device displays specific pictures 820 and 840 to give an effect that the picture is hung on the wall.

Meanwhile, the change of the brightness for the position of the light source affects the displayed objects 820 and 840 in addition to the background image. However, in order for this effect to be reflected through an image processing process, the display device 100 has to have high resource and the high resource has to be consumed continuously.

However, the display device 100 according to the example embodiment may operate with low resource because the display device 100 adjusts the brightness value for each of the areas 831, 832 and 833 as illustrated in FIG. 8B.

It has been described that the brightness value is adjusted with three areas in FIGS. 8A and 8B, but during implementation, the number of areas may be adjusted to correspond to the number of the backlights included in the display device 100.

It has been described that the partial dimming is performed without an additional image processing for an object, but during implementation, a shadow process may be performed for the displayed object. This operation will be described greater detail below with reference to FIG. 9.

Figure 9:
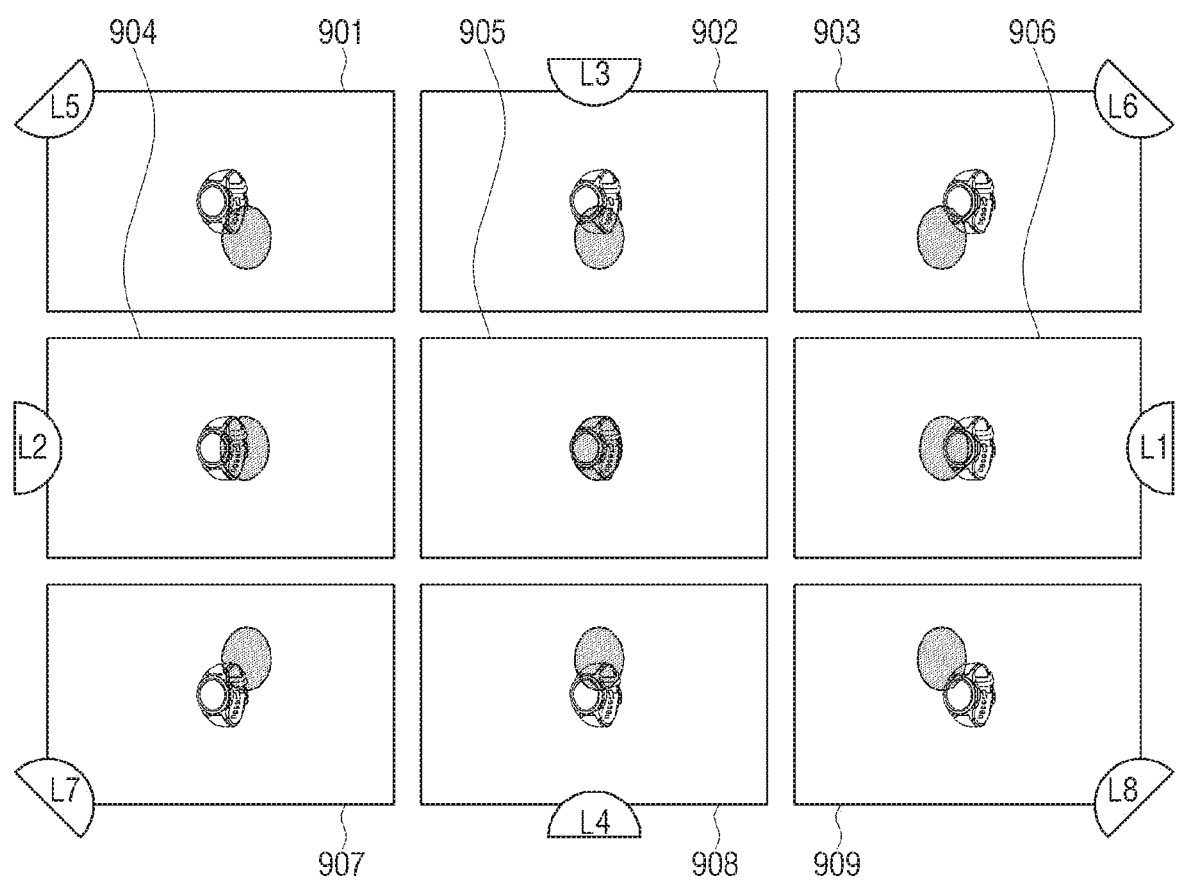
FIG. 9 is a diagram illustrating an example that changes a background image based on the acquired illumination value according to an example embodiment.

FIG. 9 is a diagram illustrating an example that changes a background image according to a third example embodiment.

Referring to FIG. 9, the display device 100 displays a preset object. Here, the display device 100 determines the position of a light source based on the sensed illumination value, and displays the object and the images 901, 902, 903, 904, 905, 906, 907, 908 and 909 which include the shadow for the object based on the determined position of the light source.

Meanwhile, it has been described that only a picture is reflected according to the position of the sensed light source, but the example embodiments of FIGS. 7, 8 and 9 may be combined and applied.

Figure 11:
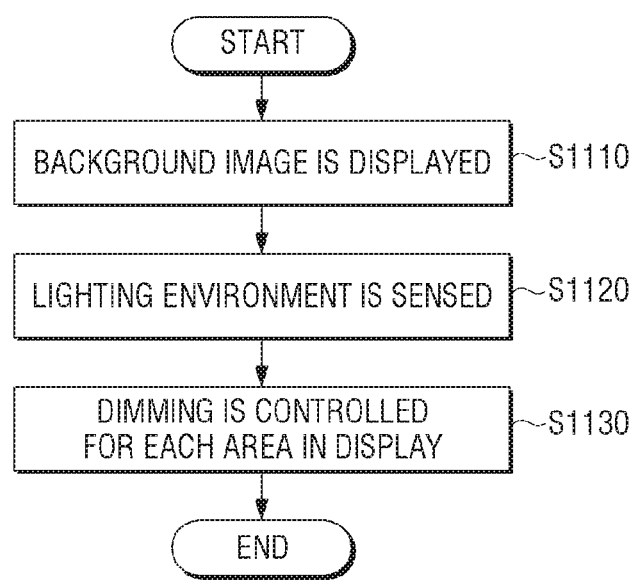
FIG. 11 is a flowchart illustrating and example displaying method according to an example embodiment.

FIG. 11 is a flowchart illustrating an example method of displaying according to an example embodiment.

Referring to FIG. 11, a background image is displayed in S1110. For example, a background image is displayed when the display device 100 operates as the second operation mode. Here, the background image may include a preset object. In addition, the background image may include a shadow object corresponding to the object which corresponds to the direction of a lighting.

The lighting environment of the surrounding of the display device is detected in S1120. Specifically, the direction of a lighting, a lighting intensity, and a color temperature may be sensed.

A plurality of light sources (or backlights) in the display device are controlled to have different brightness based on the sensed lighting environment in S1130. For example, the lighting direction may be determined based on the sensed lighting environment, a shadow object for the preset object is displayed at the position corresponding to the determined lighting direction, and the brightness of the light source corresponding to the position of the shadow object among the plurality of light sources may be adjusted according to the sensed lighting environment.

Meanwhile, if the object is displayed on the background image, the shadow object for the object may be also displayed considering the lighting direction which is sensed previously. In addition, the size of the displayed shadow object may be changed considering the sensed illumination value or the color temperature.

The displaying method according to an example embodiment detects the surrounding lighting environment and adjusts the brightness of the image displayed on the display device according to the sensed surrounding environment, and thus more realistic transparent effect may be provided to a user. The displaying method illustrated in FIG. 11 may be executed on the display device having the configuration of FIG. 2 or FIG. 3, and on the display device having other configurations.

Meanwhile, the displaying method according to example embodiments may be implemented in program and provided to display devices. For example, the program including a displaying method according to example embodiments may be stored in a non-transitory computer readable medium and provided therein.

The non-transitory computer readable medium is a medium that stores data and which is readable by an apparatus. For example, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like, but is not limited thereto.

The description of the example embodiments is intended to be illustrative, and not to limit the scope of the claims, and it will be appreciated by those skilled in the art that changes may be made to the various example embodiments without departing from the principles and spirit of the disclosure, the scope of which is defined in the appended claims and their equivalents.

What is claimed is:

1. An electronic apparatus comprising:
   a display comprising a plurality of light sources and a display panel;
   a sensor configured to sense a lighting environment; and
   a processor configured to:
   based on an operating mode of the electronic apparatus being an image effect mode among a normal mode and the image effect mode, control the display to display an image corresponding to a background of the electronics apparatus on the display panel using the plurality of light sources so as to provide an image effect on the display, the image including an object, and
   based on sensing the lighting environment through the sensor, control the display to display a shadow object corresponding to a lighting direction regarding the sensed lighting environment together with the object on the display panel using the plurality of light sources.

2. The electronic apparatus as claimed in claim 1, wherein the processor is configured to control the display to display the image so as to provide the image effect that the background of the electronic apparatus is seen as being not covered by the display.

3. The electronic apparatus as claimed in claim 1, wherein the processor is configured to, based on receiving a signal for changing the operating mode of the electronic apparatus while the operating mode of the electronic apparatus is the normal mode, change the operating mode of the electronic apparatus from the normal mode to the image effect mode, and control the display to display the image so as to provide the image effect on the display.

4. The electronic apparatus as claimed in claim 1,
   wherein the processor is configured to control the plurality of light sources so as a light source corresponding to the shadow object from among the plurality of light sources being darker than brightness of other light sources.

5. The electronic apparatus as claimed in claim 4, wherein the processor is configured to identify a dimming value for each of the plurality of light sources based on the sensed lighting environment and a position of the shadow object on the display, and to provide the identified dimming value to each of the plurality of light sources.

6. The electronic apparatus as claimed in claim 1, wherein the processor is configured to identify a size of the shadow object further based on an illumination value and a color temperature.

7. The electronic apparatus as claimed in claim 1, wherein the sensor comprises a plurality of illumination sensors disposed at a plurality of positions placed apart from each other on the electronic apparatus.

8. The electronic apparatus as claimed in claim 7, wherein the plurality of illumination sensors comprise:
   a first illumination sensor disposed at an upper left side of the electronic apparatus; and
   a second illumination sensor disposed at an upper right side of the electronic apparatus.

9. The electronic apparatus as claimed in claim 7, wherein the sensor further comprises a color sensor configured to sense one or more of an illumination, a light intensity and a color temperature.

10. A controlling method of an electronic apparatus comprising a sensor and a display comprising a plurality of light sources and a display panel, the method comprising:
    based on an operating mode of the electronic apparatus being an image effect mode among a normal mode and the image effect mode, displaying an image corresponding to a background of the electronics apparatus on the display on the display panel using the plurality of light sources so as to provide an image effect on the display, the image including an object, and
    based on sensing a lighting environment through the sensor, displaying a shadow object corresponding to a lighting direction regarding the sensed lighting environment together with the object on the display panel using the plurality of light sources.

11. The method as claimed in claim 10, wherein the displaying the image comprises display to displaying the image so as to provide the image effect that the background of the electronic apparatus is seen as being not covered by the display.

12. The method as claimed in claim 10, further comprising, based on receiving a signal for changing the operating mode of the electronic apparatus while the operating mode of the electronic apparatus is the normal mode, changing the operating mode of the electronic apparatus from the normal mode to the image effect mode.

13. The method as claimed in claim 10, wherein the displaying the shadow object comprises controlling the plurality of light sources of the display so as a brightness of a light source corresponding to the shadow object from among the plurality of light sources being darker than brightness of other light sources.

14. The method as claimed in claim 13, wherein the displaying the shadow object comprises identifying a dimming value for each of the plurality of light sources based on the sensed lighting environment and a position of the shadow object on the display, and providing the identified dimming value to each of the plurality of light sources.

15. The method as claims in claim 10, wherein the displaying the shadow object comprises identifying a size of the shadow object further based on an illumination value and a color temperature, and displaying the shadow object of the identified size at a identified position.

16. The method as claimed in claim 10, further comprising sensing a lighting environment using a plurality of illumination sensors arranged at a plurality of positions placed apart from each other at an outer part of the electronic apparatus.

17. The method as claimed in claim 16, wherein the sensing comprises sensing one or more of an illumination, a light intensity and a color temperature at at least one position from among the plurality of positions.

18. A non-transitory computer readable medium having recorded thereon a program which when executed by a processor, causes an electronic apparatus including a display comprising a plurality of light sources and a display panel to execute a controlling method, wherein the controlling method comprises:
  based on an operating mode of the electronic apparatus being an image effect mode among a normal mode and the image effect mode, displaying an image corresponding to a background of the electronics apparatus on the display on the display panel using the plurality of light sources so as to provide an image effect on the display, the image including an object, and
  based on sensing a lighting environment through the sensor, displaying a shadow object corresponding to a lighting direction regarding the sensed lighting environment together with the object on the display panel using the plurality of light sources.

\* \* \* \* \*